(12) United States Patent
Walton

(10) Patent No.: US 6,548,600 B2
(45) Date of Patent: Apr. 15, 2003

(54) THERMOPLASTIC ELASTOMER COMPOSITIONS RHEOLOGY-MODIFIED USING PEROXIDES AND FREE RADICAL COAGENTS

(75) Inventor: Kim L Walton, Lake Jackson, TX (US)

(73) Assignee: DuPont Dow Elastomers L.L.C., Wilminton, DE (US)

( * ) Notice: Subject to any disclaimer, the term of this patent is extended or adjusted under 35 U.S.C. 154(b) by 0 days.

(21) Appl. No.: 09/951,056

(22) Filed: Sep. 13, 2001

(65) Prior Publication Data

US 2002/0115796 A1 Aug. 22, 2002

Related U.S. Application Data

(60) Provisional application No. 60/234,599, filed on Sep. 22, 2000.

(51) Int. Cl.$^7$ .................. C08L 23/00; C08L 23/04; C08L 33/04; C08L 35/02; C08L 45/00
(52) U.S. Cl. .................. 525/191; 525/216; 525/222; 525/232; 525/240; 525/241
(58) Field of Search ................. 525/191, 216, 525/222, 232, 240, 241

(56) References Cited

U.S. PATENT DOCUMENTS

| | | | |
|---|---|---|---|
| 3,758,643 A | 9/1973 | Fischer | |
| 3,806,558 A | 4/1974 | Fischer | |
| 3,862,106 A | 1/1975 | Fischer | |
| 3,957,919 A | 5/1976 | Von Bodungen et al. | |
| 4,247,652 A | 1/1981 | Matsuda et al. | |
| 4,375,531 A | 3/1983 | Ross | |
| 4,985,502 A | * 1/1991 | Izumi et al. | 525/194 |
| 5,338,801 A | 8/1994 | Eppert, Jr. | |
| 5,525,675 A | 6/1996 | Masuda et al. | |
| 5,929,127 A | 7/1999 | Raetzsch et al. | |
| 5,952,396 A | * 9/1999 | Chang | 522/1 |
| 6,020,046 A | 2/2000 | Abhau | |
| 6,087,431 A | 7/2000 | Uchida et al. | |
| 6,114,486 A | 9/2000 | Rowland et al. | |
| 6,143,829 A | 11/2000 | Babb et al. | |
| 6,465,574 B1 | * 10/2002 | Mulas et al. | 525/191 |

FOREIGN PATENT DOCUMENTS

| | | |
|---|---|---|
| EP | 0 312 664 A1 | 4/1989 |
| EP | 0329 288 A2 | 8/1989 |
| EP | 0 838 497 A1 | 4/1998 |
| WO | WO98/21275 | 5/1998 |
| WO | WO98/32795 | 7/1998 |
| WO | WO98/54260 | 12/1998 |

\* cited by examiner

Primary Examiner—Nathan M. Nutter

(57) ABSTRACT

Rheology-modified thermoplastic elastomer compositions comprising a melt blend of an ethylene/α-olefin polymer and a high melting polymer such as polypropylene or a propylene/α-olefin copolymer wherein the rheology modification is induced by a combination of a peroxide and a free radical coagent. The resulting compositions have an elastomeric phase, a non-elastomeric phase and certain physical properties that exceed those of a like composition that is rheology-modified by peroxide alone. The compositions can be used to make a variety of articles of manufacture, such as automotive instrument panel skins, via calendaring and thermoforming procedures.

13 Claims, No Drawings

THERMOPLASTIC ELASTOMER COMPOSITIONS RHEOLOGY-MODIFIED USING PEROXIDES AND FREE RADICAL COAGENTS

CROSS-REFERENCE TO RELATED APPLICATIONS

This application claims the benefit of U.S. Provisional Application No. 60/234,599 filed Sep. 22, 2000.

FIELD OF THE INVENTION

This invention relates generally to rheology-modified thermoplastic elastomer (TPE) compositions that comprise an elastomeric ethylene/alpha (α)-olefin (EAO) polymer or EAO polymer blend and a high melting propylene polymer, wherein both components are peroxide-modified and to the preparation of the compositions, use of such compositions in processes such as calendaring and thermoforming to make articles of manufacture and the resulting articles of manufacture. This invention particularly relates to such compositions wherein the rheology modification is induced by a combination comprising an organic peroxide and a free radical coagent, methods for preparing the compositions, such as by modifying a physical blend of the components, and use of such compositions in calendaring operations and thermoforming applications.

BACKGROUND OF THE INVENTION

Heck et al. describe rheology modified TPE compositions in WO 98/32795. The rheology modification can be induced by various means including peroxides and radiation. The compositions of Heck et al. are said to exhibit a combination of four properties: shear thinning index (STI), melt strength (MS), solidification temperature (ST) and upper service temperature (UST). While these compositions are useful in applications such as automotive parts and boot shafts, improved compositions are needed for calendaring operations and thermoforming applications.

Compositions having a high melt toughness are desired in calendaring operations. Melt toughness, as used herein, is the product of the melt strength and the melt extensibility. In many instances, the calendar rolls are fed with a composition in the form of a molten rod. This molten composition must be able to spread across the calendar rolls. The Heck et al. compositions only spread partially across the calendar rolls.

Compositions having a high melt toughness also are preferred for thermoforming applications. In addition, tensile properties of the compositions at elevated temperatures are important for these applications. For example, one method of manufacturing instrument panel skin material is to either calender or extrude embossed sheeting. The sheeting is then vacuum thermoformed to the contour of the instrument panel. One method to determine compound thermoformability is by evaluating its elevated stress-strain behavior. Often, flexible polypropylene thermoplastic (TPO) sheets are thermoformed at temperatures below the melting point of the polypropylene phase. Although the thermoforming process is one of biaxial extension, tensile tests at the thermoforming temperatures can be used to compare thermoforming and grain retention behavior. The peaks and valleys of the embossed grain are areas of greater and lesser thickness and a look at the grain shows that the valleys are narrower and less glossy than the peak areas. When a skin is thermoformed, the thinner areas will be subject to greater stress and the greater applied stress in these areas concentrates the elongation in the thinner valley areas. These areas elongate preferentially and the attractive "narrow valley, broad peak" appearance is lost, called "grain washout"— unless the material can be designed to elongate more evenly. Strain hardening is the property by which areas of material which have already been strained become stiffer, transferring subsequent elongation into areas which are as yet unstrained. Strain hardening thus allows a thermoformed skin to exhibit more evenly distributed elongation and minimized grain washout.

One classic way to examine the strain hardening behavior of a material is the Considère construction, by which the true stress, defined as the force across the instantaneous cross sectional area is plotted against the draw ratio. Regular stress-strain graphs calculate the strain using the initial cross-sectional area, but the cross sectional area diminishes as the sample is strained. The Considère construction is often used to evaluate cold-drawing phenomena.

The Considère construction can be determined by the following equation:

$$\sigma_T = \sigma(1+\epsilon)$$

where:
$\sigma_T$=true stress
$\sigma$=engineering stress
$\epsilon$=draw ratio=$(L-Li)/Li$
where:
L=sample length under deformation
Li=initial sample length The thermoformable compound must also exhibit acceptable elongation characteristics at elevated temperature. If the elongation is too low, the sheeting will tear when thermoformed. Thus, two particularly significant tensile properties are true ultimate tensile strength at 140° C. and elongation to break at 140° C. Under extreme draw conditions of some thermoforming applications, the Heck et al. compositions form holes leading to part failure.

Compositions having greater melt extensibility can be produced by lowering the level of peroxide used for rheology modification. However, lower peroxide levels result in lower melt strength and less tensile strength. Thus, there is a need to produce rheology-modified TPE compositions having an improved melt toughness. Further there is a need to enhance the high temperature tensile properties of such compositions for thermoforming applications.

SUMMARY OF THE INVENTION

Applicant has found that rheology modification by addition of at least one peroxide and at least one free radical coagent has a signicant effect on the melt toughness and high temperature tensile properties of blends of at least one elastomeric EAO polymer or EAO polymer blend and a polyolefin such as PP. The rheology modified compositions of this invention have melt toughness and high temperature tensile properties that are higher than corresponding compositions rheology modified by the addition of peroxides alone. As such, one aspect of this invention is a rheology-modified, substantially gel-free thermoplastic elastomer (TPE) composition comprising an EAO polymer or EAO polymer blend and a high melting polymer selected from the group consisting of polypropylene homopolymers and propylene/ethylene copolymers, wherein the composition is rheology modified by at least one peroxide and at least one free radical coagent and the rheology modified composition has a melt toughness of at least 600 centinewton millimeters per second (cNmm/s), a true ultimate tensile strength at 140° C. of at least 3 mega-Pascals (MPa) and an elongation to break at 140° C. of at least 400%. The TPE compositions may be compounded with conventional additives or process aids including, for example, fillers, stabilizers, dispersants, pigments and process oils. Compounds prepared from the rheology modified polymers of this invention retain their processing advantages over compounds prepared from the same polymers, but rheology modified by peroxide alone.

A second aspect of this invention is a process for preparing a rheology-modified, substantially gel-free TPE composition, the process comprising: a) adding at least one peroxide and at least one free radical coagent to a molten polymer blend that comprises an elastomeric ethylene/alpha-olefin polymer and a high melting polymer selected from the group consisting of polypropylene homopolymers and propylene/ethylene copolymers; and b) maintaining the polymer blend in a molten state while subjecting it to conditions of shear sufficient to disperse the peroxide and coagent throughout the molten polymer blend, effect rheology modification of the polymers and substantially preclude formation of insoluble polymer gels, sufficient rheology modification being measured by a melt toughness of at least 600 centinewton millimeters per second (cNmm/s), a true ultimate tensile strength at 140° C. of at least 3 mega-Pascals (MPa) and an elongation to break at 140° C. of at least 400%. The process optionally includes a step c) wherein the rheology modified polymer blend is converted to an article of manufacture, preferably without intermediate steps of recovering the rheology modified polymer blend as a solid and then converting the solid to a melt state sufficient for fabricating the article of manufacture. If desired, however, the process optionally includes the intermediate steps.

One variation of the second aspect is a process for preparing a rheology-modified, substantially gel-free TPE composition, the process comprising: a) adding at least one peroxide and at least one free radical coagent to at least one component of a polymer blend that comprises an elastomeric ethylene/alpha-olefin polymer and a high melting polymer selected from the group consisting of polypropylene homopolymers and propylene/ethylene copolymers; and b) converting the polymer blend to a molten polymer blend while subjecting the blend to conditions of shear sufficient to disperse the peroxide and coagent throughout the molten polymer blend, effect rheology modification of the polymers and substantially preclude formation of insoluble polymer gels, sufficient rheology modification being measured by a melt toughness of at least 600 centinewton millimeters per second (cNmm/s), a true ultimate tensile strength at 140° C. of at least 3 mega-Pascals (MPa) and an elongation to break at 140° C. of at least 400%. The process optionally includes a sequential step c) wherein the rheology modified polymer blend is converted to an article of manufacture, preferably without intermediate steps of recovering the rheology modified polymer blend as a solid and then converting the solid to a melt state sufficient for fabricating the article of manufacture. If desired, however, the process optionally includes the intermediate steps.

A second variation of the second aspect is a process for preparing a rheology-modified, substantially gel-free thermoplastic elastomer article of manufacture, the process comprising: a) adding at least one peroxide and at least one free radical coagent to a molten elastomeric ethylene/alpha-olefin polymer or elastomeric ethylene/alpha-olefin polymer blend to provide a rheology-modified ethylene/alpha-olefin polymer or ethylene/alpha-olefin polymer blend; b) adding to the rheology-modified polymer or polymer blend a high melting polymer selected from the group consisting of polypropylene homopolymers and propylene/ethylene copolymers to form a composite polymer blend; and c) converting the composite polymer blend into the article of manufacture, the article of manufacture having a melt toughness of at least 600 centinewton millimeters per second (cNmm/s), an true ultimate tensile strength at 140° C. of at least 3 mega-Pascals (MPa) and an elongation to break at 140° C. of at least 400%.

A third aspect of this invention is an article of manufacture having at least one component thereof fabricated from the TPE composition of the first aspect of the invention. The TPE compositions suitably include at least one additive selected from the group consisting of process oils, fillers and blowing agents. The compositions readily allow formation of articles of manufacture using apparatus for calendaring and/or thermoforming. In a related aspect, the TPE compositions of the first aspect may be blended with another polymer, preferably one of the polymers used to make the TPE composition, prior to fabrication of an article of manufacture. Such blending may occur by any of a variety of conventional techniques, one of which is dry blending of pellets of the TPE composition with pellets of another polymer.

DESCRIPTION OF PREFERRED EMBODIMENTS

The rheology-modified compositions of this invention comprise an elastomeric EAO polymer or EAO polymer blend and a high melting polymer. The compositions desirably contain the EAO polymer or EAO polymer blend in an amount of from about 50 to about 90 wt % and the high melting polymer(s) in an amount of from about 50 to about 10 wt %, both percentages being based on composition weight. The amounts are preferably from about 65 to about 85 wt % EAO and from about 35 to about 15 wt % high melting polymer. The amounts are chosen to total 100 wt % polymer.

EAO polymers (also referred to as "ethylene polymers") that are suitable for this invention include interpolymers and diene modified interpolymers. Illustrative polymers include ethylene/propylene (EP) copolymers, ethylene/butylene (EB) copolymers, ethylene/octene (EO) copolymers and ethylene/propylene/diene modified (EPDM) interpolymers. More specific examples include ultra low linear density polyethylene (ULDPE) (e.g., Attane™ made by The Dow Chemical Company), homogeneously branched, linear EAO copolymers (e.g. Tafmer™ by Mitsui PetroChemicals Company Limited and Exact™ by Exxon Chemical Company), and homogeneously branched, substantially linear EAO polymers (e.g. the Affinity™ polymers available from The Dow Chemical Company and Engage® polymers available from DuPont Dow Elastomers L.L.C. The more preferred EAO polymers are the homogeneously branched linear and substantially linear ethylene copolymers with a density (measured in accordance with ASTM D-792) of from about 0.85 to about 0.92 g/cm$^3$, especially from about 0.85 to about 0.90 g/cm$^3$ and a melt index or $I_2$ (measured in accordance with ASTM D-1238 (190° C./2.16 kg weight) of from about 0.01 to about 30, preferably 0.05 to 10 g/10 min.

The substantially linear ethylene copolymers or interpolymers (also known as "SLEPs") are especially preferred. In addition, the various functionalized ethylene copolymers such as EVA (containing from about 0.5 to about 50 wt % units derived from vinyl acetate) are also suitable. When using an EVA polymer, those that have an $I_2$ of from about 0.01 to about 500, preferably 0.05 to 50 g/10 min are preferred.

"Substantially linear" means that a polymer has a backbone substituted with from 0.01 to 3 long-chain branches per 1000 carbons in the backbone.

"Long-chain branching" or "LCB" means a chain length that exceeds that of the alpha-olefin component of the EAO polymer or EAO polymer blends. Although carbon-13 nuclear magnetic resonance (C-13 NMR) spectroscopy cannot distinguish or determine an actual number of carbon atoms in the chain if the length is greater than six carbon atoms, the presence of LCB can be determined, or at least estimated, from molecular weight distribution of the EAO polymer(s). It can also be determined from a melt flow ratio (MFR) or ratio ($I_{10}/I_2$) of melt index ($I_{10}$) via ASTM D-1238 (190° C., 10 kg weight) to $I_2$.

"Interpolymer" refers to a polymer having polymerized therein at least two monomers. It includes, for example, copolymers, terpolymers and tetrapolymers. It particularly includes a polymer prepared by polymerizing ethylene with at least one comonomer, typically an α-olefin of 3 to 20 carbon atoms ($C_3$–$C_{20}$). Illustrative α-olefins include propylene, 1-butene, 1-hexene, 4-methyl-1-pentene, 1-heptene, 1-octene and styrene. The α-olefin is desirably a $C_3$–$C_{10}$ α-olefin. Preferred copolymers include EP, EB, ethylene/hexene-1 (EH) and EO polymers. Illustrative terpolymers include an ethylene/propylene/octene terpolymer as well as terpolymers of ethylene, a $C_3$–$C_{20}$ α-olefin and a diene such as dicyclopentadiene, 1,4-hexadiene, piperylene or 5-ethylidene-2-norbornene.

"Elastomeric", as used herein, means an EAO polymer or EAO polymer blend that has a density that is beneficially less than about 0.920 g/cc, desirably less than about 0.900 g/cc, preferably less than about 0.895 g/cc, more preferably less than about 0.880 g/cc, still more preferably less than about 0.875 g/cc, even more preferably less than about 0.870 g/cc and a percent crystallinity of less than about 33%, preferably less than about 29% and more preferably less than about 23%. The density is preferably greater than about 0.850 g/cc. Percent crystallinity is determined by differential scanning calorimetry (DSC).

SLEPs are characterized by narrow molecular weight distribution (MWD) and narrow short chain branching distribution (SCBD) and may be prepared as described in U.S. Pat. Nos. 5,272,236 and 5,278,272, relevant portions of both being incorporated herein by reference. The SLEPs exhibit outstanding physical properties by virtue of their narrow MWD and narrow SCBD coupled with long chain branching (LCB).

U.S. Pat. No. 5,272,236 (column 5, line 67 through column 6, line 28) describes SLEP production via a continuous controlled polymerization process using at least one reactor, but allows for multiple reactors, at a polymerization temperature and pressure sufficient to produce a SLEP having desired properties. Polymerization preferably occurs via a solution polymerization process at a temperature of from 20° C. to 250° C., using constrained geometry catalyst technology. Suitable constrained geometry catalysts are disclosed at column 6, line 29 through column 13, line 50 of U.S. Pat. No. 5,272,236.

A preferred SLEP has a number of distinct characteristics, one of which is an ethylene content that is between 20 and 90 wt %, more preferably between 30 and 89 wt %, with the balance comprising one or more comonomers. The ethylene and comonomer contents are based on SLEP weight and selected to attain a total monomer content of 100 wt %. For chain lengths up to six carbon atoms, SLEP comonomer content can be measured using C-13 NMR spectroscopy.

Additional distinct SLEP characteristics include $I_2$ and MFR or $I_{10}/I_2$. The interpolymers desirably have an $I_2$ of 0.01–30 g/10 min, more preferably from 0.05–10 g/10 min. The SLEP also has a $I_{10}/I_2$ (ASTM D-1238)$\geq$5.63, preferably from 6.5 to 15, more preferably from 7 to 10. For a SLEP, the $I_{10}/I_2$ ratio serves as an indication of the degree of LCB such that a larger $I_{10}/I_2$ ratio equates to a higher degree of LCB in the polymer.

SLEPs that meet the aforementioned criteria include, for example, Engage® polyolefin elastomers and other polymers produced via constrained geometry catalysis by The Dow Chemical Company and DuPont Dow Elastomers L.L.C.

The high melting polymer component of the TPEs of this invention is a homopolymer of propylene or a copolymer of propylene with an α-olefin such as ethylene, 1-butene, 1-hexene or 4-methyl-1-pentene or a blend of a homopolymer and a copolymer. Each of the homopolymer, the copolymer or the blend of a homopolymer and a copolymer may be nucleated. The α-olefin is preferably ethylene. The copolymer may be a random copolymer or a block copolymer or a blend of a random copolymer and a block copolymer. As such, this component is preferably selected from the group consisting of polypropylene (PP) homopolymers and propylene/ethylene copolymers. This component has a MFR (230° C. and 2.16 kg weight) of 0.3 to 60 g/10 min, preferably 0.8 to 40 g/10 min and more preferably 1 to 35 g/10 min.

As used herein, "nucleated" refers to a polymer that has been modified by addition of a nucleating agent such as Millad™, a dibenzyl sorbitol commercially available from Milliken. Other conventional nucleating agents may also be used.

Preparation of polypropylene (PP) also involves the use of Ziegler catalysts such as a titanium trichloride in combination with aluminum diethylmonochloride, as described by Cecchin, U.S. Pat. No. 4,177,160. Polymerization processes used to produce PP include the slurry process, which is run at about 50–90° C. and 0.5–1.5 MPa (5–15 atm), and both the gas-phase and liquid-monomer processes in which extra care must be given to the removal of amorphous polymer. Ethylene may be added to the reaction to form a polypropylene with ethylene blocks. PP resins may also be prepared by using any of a variety of metallocene, single site and constrained geometry catalysts together with their associated processes.

The peroxide is preferably an organic peroxide. Suitable organic peroxides have a half life of at least one hour at 120° C. Illustrative peroxides include a series of vulcanizing and polymerization agents that contain α,α'-bis(t-butylperoxy)-diisopropylbenzene and are available from Hercules, Inc. under the trade designation VULCUP™, a series of such agents that contain dicumyl peroxide and are available from Hercules, Inc. under the trade designation Di-cup™ as well as Lupersol™ peroxides made by Elf Atochem, North America or Trigonox™ organic peroxides made by Akzo Nobel. The Lupersol™ peroxides include Lupersol™ 101 (2,5-dimethyl-2,5-di(t-butylperoxy)hexane), Lupersol™130 (2,5-dimethyl-2,5-di(t-butylperoxy)hexyne-3) and Lupersol™575 (t-amyl peroxy-2-ethylhexonate). Other suitable peroxides include 2,5-dimethyl-2,5-di-(t-butyl peroxy) hexane, di-t-butylperoxide, di-(t-amyl)peroxide, 2,5-di(t-amyl peroxy)-2,5-dimethylhexane, 2,5-di-(t-butylperoxy)-2, 5-diphenylhexane, bis(alpha-methylbenzyl)peroxide, benzoyl peroxide, t-butyl perbenzoate, 3,6,9-triethyl-3,6,9-trimethyl-1,4,7-triperoxonane and bis(t-butylperoxy)-diisopropylbenzene.

The peroxide is suitably present in an amount that is within a range of from about 100 to about 10,000 parts by weight per million parts by weight of polymer. The range is desirably from about 500 to about 5,000, preferably from about 1,000 to about 3,000 parts by weight.

The free radical coagent is a monomer or low molecular weight polymer having two or more functional groups with high response to free radicals. Typically, these functional groups are either methacrylate, allyl or vinyl. The free radical coagent enhances the rheology modification of the peroxide by two mechanisms. Firstly, by peroxide induced allylic hydrogen abstraction from the coagent, a lower energy state, longer lived free radical is created. This free radical can then induce branching in the ethylene elastomer by hydrogen abstraction. Due to the lower energy state of the free radical, β-scissioning and disproportionation of either the polypropylene or ethylene elastomer phase is less likely to occur. Secondly, the multifunctional coagent can act as a bridging group between the polymer chains.

Suitable free radical coagents for this application would include diallyl terephthalate, triallylcyanurate, triallylisocyanurate, 1,2 polybutadiene, divinyl benzene, trimethylolpropane trimethacrylate, polyethylene glycol dimethacrylate, ethylene glycol dimethacrylate, pentaerythritol triacrylate, allyl methacrylate, N N'-m-phenylene bismaleimide, toluene bismaleimide-p-quinone dioxime, nitrobenzene, diphenylguanidine. Preferred coagents are triallylcyanurate, 1,2 polybutadiene, divinyl benzene, and trimethyolpropane trimethacrylate.

The coagent is suitably present in an amount that is within the range of from about 100 to about 10,000 parts per million by weight. The range is desirably from about 500 to about 5,000 parts, preferably from 1,000 to 3,000 parts per million by weight.

The peroxide and free radical coagent can be added by any conventional means. Illustrative procedures include imbibing it onto polymer pellets prior to compounding, adding it to polymer pellets as the pellets enter a compounding apparatus such as at the throat of an extruder, adding it to a polymer melt in a compounding apparatus such as a Haake, a Banbury mixer, a Farrel continuous mixer or a Buss kneader or injecting it into an extruder, at 100% active ingredients (i.e., neat) or optionally as a dispersion or solution in an oil, such as a processing oil, at a point where the extruder contents are molten. A preferred procedure is imbibing the peroxide and coagent into the polymer pellets prior to compounding.

The peroxide and free radical coagent are used in amounts sufficient to provide a melt toughness of at least 600 centinewton millimeters per second (cNmm/s), a true ultimate tensile strength at 140° C. of at least 3 mega-Pascals (MPa) and an elongation to break at 140° C. of at least 400% without substantial gel formation. The ratio of coagent to peroxide is suitably within the range from about 1:10 to 10:1 based on wt. %. A more preferred ratio range is from about 1:5 to 5:1 and the most preferred ratio range is from about 1:2 to about 2:1. The optimum ratio of coagent is dependent on the ethylene/-olefin-polypropylene ratio used in the compounds. A suitable range of EAO/PP on a weight percent basis is 80/20–40/60. The preferred range is 65/35–75/25 weight percent.

Melt toughness, as used herein, is the product of the melt strength and melt extensibility. Melt strength (MS), as used herein, is a maximum tensile force measured on a molten filament of a polymer melt extruded from a capillary rheometer die at a constant shear rate of 33 reciprocal seconds (sec-1) while the filament is being stretched by a pair of nip rollers that are accelerating the filament at a rate of 0.24 centimeters per second per second (cm/sec$^2$) from an initial speed of 1 cm/sec. The molten filament is preferably generated by heating 10 grams (g) of a polymer that is packed into a barrel of an Instron capillary rheometer, equilibrating the polymer at 190° C. for five minutes and then extruding the polymer at a piston speed of 2.54 cm/minute (cm/min) through a capillary die with a diameter of 0.21 cm and a length of 4.19 cm. The tensile force is preferably measured with a Goettfert Rheotens that is located so that the nip rollers are 10 cm directly below a point at which the filament exits the capillary die. Melt extensibility (ME), as used herein, is the maximum speed of the nip rollers from the Goettfert Rheotens needed to break the filament, measured in cm/sec.

The high temperature ultimate tensile strength or ultimate tensile strength at 140° C., as used herein, is measured by cutting ISO 37 T2 dumbbell bars from either the compression molded plaque or extruded sheet. When testing extruded sheet, the bars are cut in the machine direction. The cut bar is then placed in a tensile testing machine fitted with an environmental chamber heated to 140° C. The bar is allowed to equilibrate for 10 minutes, then is strained at a cross head speed of 50 cm/min. The tensile strength and elongation to break are recorded.

In order to detect the presence of, and where desirable, quantify insoluble gels in a polymer composition such as the rheology-modified compositions of this invention, simply soak the composition in a suitable solvent such as refluxing xylene for 12 hours as described in ASTM D 2765-90, method B. Any insoluble portion of the composition is then isolated, dried and weighed, making suitable corrections based upon knowledge of the composition. For example, the weight of non-polymeric components that are soluble in the solvent is subtracted from the initial weight and the weight of non-polymeric components that are insoluble in the solvent is subtracted from both the initial and final weight. The insoluble polymer recovered is reported as percent gel content. For purposes of this invention, "substantially gel-free" means a percent gel content that is desirably less than about 10%, more desirably less than about 8%, preferably less than about 5%, more preferably less than about 3%, still more preferably less than about 2%, even more preferably less than about 0.5% and most preferably below detectable limits when using xylene as the solvent. For certain end use applications where gels can be tolerated, the percent gel content can be higher.

The compositions of this invention may be compounded with any one or more materials conventionally added to polymers. These materials include, for example, EAOs that have not been rheology modified, process oils, plasticizers, specialty additives including stabilizers, fillers (both reinforcing and non-reinforcing) and pigments. These materials may be compounded with compositions of this invention either before or after such compositions are rheology modified. Skilled artisans can readily select any suitable combination of additives and additive amounts as well as timing of compounding without undue experimentation.

Process oils are often used to reduce any one or more of viscosity, hardness, modulus and cost of a composition. The most common process oils have particular ASTM designations depending upon whether they are classified as paraffinic, naphthenic or aromatic oils. An artisan skilled in the processing of elastomers in general and the rheology-modified TPE compositions of this invention in particular will recognize which type of oil will be most beneficial. The process oils, when used, are desirably present in an amount within a range of from about 0.5 to about 50 wt %, based on total composition weight. Certain low to medium molecular weight ester plasticizers may also used to enhance low temperature performance. Examples of esters which may be used include isooctyltallate, isooctyloleate, n-butyltallate, n-butyloleate, butoxyethyloleate, dioctylsebacate, di2-ethyle hexylsebacate, dioctylazelate, diisooctyidodecanedioate, alkylalkylether diester glutarate.

A variety of specialty additives may be advantageously used in compositions of this invention. The additives include antioxidants, surface tension modifiers, anti-block agents, lubricants, antimicrobial agents such as organometallics, isothtazolones, organosulfurs and mercaptans; antioxidants such as phenolics, secondary amines, phophites and thioesters; antistatic agents such as quaternary ammonium compounds, amines, and ethoxylated, propoxylated or glycerol compounds; fillers and reinforcing agents such as carbon black, glass, metal carbonates such as calcium carbonate, metal sulfates such as calcium sulfate, talc, clay or graphite fibers; hydrolytic stabilizers; lubricants such as fatty acids, fatty alcohols, esters, fatty amides, metallic stearates, paraffinic and microcrystalline waxes, silicones and orthophosphoric acid esters; mold release agents such as fine-particle or powdered solids, soaps, waxes, silicones, polyglycols and complex esters such as trimethylolpropane tristearate or pentaerythritol tetrastearate; pigments, dyes and colorants; plasticizers such as esters of dibasic acids (or their anhydrides) with monohydric alcohols such as o-phthalates, adipates and benzoates; heat stabilizers such as organotin mercaptides, an octyl ester of thioglycolic acid and a barium or cadmium carboxylate; ultraviolet light stabilizers used as a hindered amine, an o-hydroxyphenylbenzotriazole, a 2-hydroxy,4-alkoxyenzophenone, a salicylate, a cynoacrylate, a nickel chelate and a benzylidene malonate and oxalanilide. A preferred hindered phenolic antioxidant is Irganox™ 1076 antioxidant, available from Ciba-Geigy Corp. Each of the above additives, if used, typically does not exceed 45 wt %, based on total composition weight, and are advantageously from about 0.001 to about 20 wt %, preferably from about 0.01 to about 15 wt % and more preferably from about 0.1 to about 10 wt %.

The rheology-modified TPE compositions of this invention may be fabricated into parts, sheets or other form using any one of a number of conventional procedures for processing TPEs. The compositions can also be formed, spun or drawn into films, fibers, multi-layer laminates or extruded sheets, or can be compounded with one or more organic or inorganic substances, on any machine suitable for such purposes. The compositions are particularly advantageous for high temperature TPE processes such as calendaring, extruding and thermoforming.

The TPE compositions of this invention have surprisingly improved properties relative to blends of an EAO copolymer and a high melting polymer such as PP that have been subjected to rheology modification by peroxide only. Rheology modification by way of peroxide and free radical coagent provides a combination of desirable and improved melt toughness and high temperature tensile properties.

The compositions of this invention can be formed into a variety of shaped articles using conventional polymer fabrication processes such as those identified above. A partial, far from exhaustive, listing of suitable shaped articles includes automobile body parts such as instrument panel skins, bumper fascia, body side moldings, exterior trim, interior trim, weather stripping, air dams, air ducts, and wheel covers, and non-automotive applications such as polymer films, polymer sheets, tubing, trash cans, storage containers, lawn furniture strips or webbing, lawn mower, garden hose, and other garden appliance parts, recreational vehicle parts, golf cart parts, utility cart parts and water craft parts. The compositions can also be used in roofing applications such as roofing membranes. The compositions can further be used in fabricating components of footwear such as a shaft for a boot, particularly an industrial work boot. A skilled artisan can readily augment this list without undue experimentation.

The following examples illustrate but do not, either explicitly or by implication, limit the present invention. Unless otherwise stated, all parts and percentages are by weight, on a total weight basis. Examples of the present invention are identified by Arabic numerals and comparative examples are represented by letters of the alphabet.

EXAMPLES AND COMPARATIVE EXAMPLE

Nine compositions, eight representing this invention (Examples 1–8) and one being a comparison (Comparative Example A), were prepared from two different EAO polymers using the following procedure. All nine compositions were produced by tumble blending the ingredients together, allowing the peroxide and coagent to imbibe into the pellets, then processing the blend into pellets on a Werner Pfliederer ZSK-30 co-rotating twin screw extruder. The pelletized compounds were then processed into sheeting on a 2 inch Killion single screw extruder fitted with a 6 inch wide sheeting die. Sheeting 0.050 inch thick was produced and tested.

The EAO polymers used in the examples were: EAO-1, an ethylene/1-octene copolymer having an $I_2$ of 0.5 g/10 min and a nominal density of 0.863 g/cc (Engage® 8180 polyolefin elastomer from DuPont Dow Elastomers L.L.C.); EAO-2, an experimental ethylene/1-octene copolymer having a nominal Mooney viscosity of 47, a nominal density of 0.868 g/cc, a number average molecular weight of about 80,000 and a molecular weight distribution (MWD) of about 2.3, as measured by gel permeation chromatography (produced by DuPont Dow Elastomers L.L.C.); and EAO-3, an experimental ethylene/1-butene copolymer having a nominal Mooney viscosity of 45, a nominal density of 0.870 g/cc, a number average molecular weight (Mn) of about 78,000, and a molecular weight distribution (MWD) of about 2.0 as measured by gel permeation chromatography (produced by DuPont Dow Elastomers L.L.C.).

The polypropylene (PP) used in the examples was a polypropylene homopolymer having a melt flow of 0.8 (Profax PD-191 from Montell).

The peroxides used in the examples were: POX-1,2,5-dimethyl-2,5-di(t-butylperoxy)hexane (Lupersol 101 from Elf Atochem); and POX-2, di(t-amyl)peroxide (DTAP from Crompton Chemical).

The free radical coagents used in the examples were: FRC-1, trimethylolpropane trimethacrylate (SR-350 KD96 (75% SR-350 from Sartomer Company, Inc. on calcium silicate prepared by Akron Dispersions)); FRC-2, trimethylolpropane trimethacrylate (100% SR-350 from Sartomer Company, Inc.); FRC-3, triallyl cyanurate (TAC from Cytec Industries, Inc.); and FRC-4, 1,2-polybutadiene (Ricon 152D (68% Ricon 152 from Sartomer Coporation on calcium silicate, prepared by Akron Dispersions)). FRC-4 was warmed to about 30° C. to form a liquid prior to tumble blending.

Examples 1–2 and Comparative Example A

Table I summarizes data for the compositions of Examples 1–2 and Comparative Example A. Table I identifies the EAO polymer, the peroxide and the free radical coagent (for Examples 1 and 2), and specifies the wt % of the ingredients.

TABLE I

| Example | EAO-1 | PP | POX-1 | FRC-1 |
|---------|-------|------|-------|-------|
| 1 | 68.7 | 30.8 | 0.2 | 0.3 |
| 2 | 68.6 | 30.7 | 0.3 | 0.4 |
| A | 68.6 | 30.7 | 0.7 | 0 |

The properties of the compositions of the examples and comparative example were determined and are reported in Table II below. A Goeffert Rheotens measured the melt strength (MS) and melt extensibility (ME) of a molten filament of a polymer melt extruded from a capillary rheometer die. Melt toughness (MT) is the product of the MS and the ME. A constant shear rate of 33 sec$^{-1}$ was maintained while the filament was being stretched by a pair of nip rollers that were accelerating the filament at a rate of 0.24 cm/sec$^2$ from an initial speed of 1 cm/sec. The nip rollers were fitted with strain gages to measure the stress response of the molten filament to strain. Elevated temperature (140° C.) stress strain was measured with a tensile testing machine fitted with an environmental chamber heated to 140° C. The true stress (true ultimate tensile strength (TUTS)) was determined using the Considere equation and the elongation to break (ultimate strain (US)) was measured. Gel content of the composition was measured by extracting with refluxing xylene for 12 hours as described in ASTM D 2765-90.

TABLE II

| Example | MS (cN) | ME (mm/s) | MT (cNmm/s) | 140° C. TUTS (Mpa) | 140° C. US (%) | Gel (wt %) |
|---------|---------|-----------|-------------|--------------------|----------------|------------|
| 1 | 10.58 | 115.6 | 1223 | 0.480 | >1200 | 0.9 |
| 2 | 17.36 | 78.1 | 1356 | 0.905 | 523 | 0.6 |
| A | 7.55 | 75.3 | 569 | 0.457 | 344 | 1.0 |

The data presented in Table II illustrate several points. First, Examples 1 and 2 show significantly higher melt toughness than Comparative Example A. These results evidence that higher melt toughness is obtained using a lower level of peroxide with a free radical coagent. Second, Examples 1 and 2 show greater tensile properties at the high temperature of 140° C. Example 1 has a slightly higher true ultimate tensile strength and a significantly higher ultimate stress than Comparative Example A. Example 2 has nearly twice the true ultimate tensile strength and significantly higher ultimate stress than Comparative Example A. Similar results are expected with other EAO polymers, propylene polymers, and rheology modifiers or modification processes, all of which are disclosed above.

Examples 3–8

Using different EAO polymers, peroxides and/or free radical coagents, the procedure and apparatus of Examples 1–2 were used to prepare six additional compositions of the invention. Table III identifies the EAO polymer, the peroxide and the free radical coagent, and specifies the wt % of the ingredients.

TABLE III

| Ex. | EAO-1 | EAO-2 | EAO-3 | PP | POX-1 | POX-2 | FRC-2 | FRC-3 | FRC-4 |
|-----|-------|-------|-------|---------|-------|-------|-------|-------|-------|
| 3 | 69.79 | 0 | 0 | 29.91 | 0 | 0.15 | 0.15 | 0 | 0 |
| 4 | 69.79 | 0 | 0 | 29.91 | 0.15 | 0 | 0 | 0.15 | 0 |
| 5 | 0 | 69.79 | 0 | 29.91 | 0.15 | 0 | 0.15 | 0 | 0 |
| 6 | 0 | 69.79 | 0 | 29.91 | 0.05 | 0 | 0.05 | 0 | 0 |
| 7 | 0 | 0 | 69.79 | 29.91 | 0.15 | 0 | 0.15 | 0 | 0 |
| 8 | 69.7585 | 0 | 0 | 29.8965 | 0.15 | 0 | 0 | 0 | 0.195 |

Table IV The properties of the compositions of Examples 3–8 were determined in the same manner as described above for Examples 1–2 and Comparative Example A. They are reported in Table IV below.

TABLE IV

| Example | MS (cN) | ME (mm/s) | MT (cNmm/s) | 140° C. TUTS (Mpa) | 140° C. US (%) | Gel (wt %) |
|---------|---------|-----------|-------------|---------------------|-----------------|------------|
| 3 | 27 | 43 | 1161 | 5.25 | 1367 | 0.9 |
| 4 | 25 | 61 | 1525 | 5.09 | 1287 | 1.4 |
| 5 | 27 | 45.9 | 1239 | 4.26 | 1510 | 1.1 |
| 6 | 13 | 82.6 | 1074 | 7.71 | 1300 | 0.9 |
| 7 | 21 | 65.3 | 1371 | 11.7 | 1324 | 0.16 |
| 8 | 21 | 55.4 | 1163 | 9.6 | 1364 | 0.30 |

Examples 3–8 show much higher melt toughness (1074–1525 cN-mm/s) than Comparative Example A (569 cN-mm/s). Further, Examples 3–8 show much higher true ultimate tensile strength at 140° C. and significantly higher ultimate strain at 140° C. than Comparative Example A. Similar results are expected with other EAO polymers and blends of EAO polymers, PP polymers, peroxides, free radical coagents or procedures and amounts of the same, all of which are disclosed herein.

What is claimed is:

1. A rheology-modified, substantially gel-free thermoplastic elastomer composition comprising at least one elastomeric ethylene/alpha-olefin polymer or ethylene/alpha-olefin polymer blend and at least one high melting polymer selected from the group consisting of polypropylene homopolymers and propylene/ethylene copolymers, wherein the rheology modification is induced by a combination comprising a peroxide and a free radical coagent and the composition has a melt toughness of at least about 600 cNmm/s, a true ultimate tensile strength at 140° C. of at least about 3 MPa and an elongation to break at 140° C. of least about 400%.

2. The composition of claim 1 wherein the peroxide is an organic peroxide.

3. The composition of claim 2 wherein the organic peroxide is selected from the group consisting of α,α'-bis(t-butylperoxy)-diisopropylbenzene, dicumyl peroxide, di-(t-amyl)peroxide, 2,5-dimethyl-2,5-di(t-butylperoxy)hexyne-3, 2,5 (t-amyl peroxy-2-ethylhexonate), 2,5-dimethyl-2,5-di-(t-butyl peroxy)hexane, di-t-butylperoxide, 2,5-di(t-amyl peroxy)-2,5-dimethylhexane, 2,5-di-(t-butylperoxy)-2,5-diphenylhexane, bis(alpha-methylbenzyl)peroxide, t-butyl perbenzoate, benzoyl peroxide, 3,6,9-triethyl-3,6,9-trimethyl-1,4,7-triperoxonane and bis(t-butylperoxy)-diisopropylbenzene.

4. The composition of claim 1 wherein the free radical coagent is selected from the group consisting of diallyl terephthalate, triallylcyanurate, triallylisocyanurate, 1,2-polybutadiene, divinyl benzene, trimethylolpropane trimethacrylate, polyethylene glycol dimethacrylate, ethylene glycol dimethacrylate, pentaerythritol triacrylate, allyl methacrylate, N,N'-m-phenylene bismaleimide, toluene bismaleimide-p-quinone dioxime, nitrobenzene, and diphenylguanidine.

5. The composition of claim 4 wherein the free radical coagent is selected from the group consisting of triallylcyanurate, 1,2-polybutadiene, divinyl benzene, and trimethylolpropane trimethacrylate.

6. The composition of claim 1, wherein the ethylene/α-olefin polymer has polymerized therein at least one α-olefin comonomer, the α-olefin containing from 3 to 20 carbon atoms.

7. The composition of claim 6, wherein the α-olefin contains from 3 to 10 carbon atoms.

8. The composition of claim 1, wherein the ethylene/α-olefin polymer is a diene-modified polymer, the diene being selected from the group consisting of norbornadiene, dicyclopentadiene, 1,4-hexadiene, piperylene or 5-ethylidene-2-norbornene and mixtures thereof.

9. The composition of claim 1, wherein the high melting polymer is a nucleated polymer.

10. The composition of claim 1, further comprising a process oil in an amount within a range of from greater than 0 to about 50 weight percent, based on total composition weight.

11. The composition of claim 1 or claim 10, further comprising a filler in an amount within a range of from about 0 to about 70 weight percent, based on total composition weight.

12. The composition of claim 1 or claim 10, further comprising a blowing agent in an amount within a range of from greater than 0 to about 10 weight percent, based on total composition weight.

13. The composition of claim 11, further comprising a blowing agent in an amount within a range of from greater than 0 to about 10 weight percent, based on total composition weight.

* * * * *